(12) United States Patent
Park et al.

(10) Patent No.: US 8,503,563 B2
(45) Date of Patent: Aug. 6, 2013

(54) TRANSMITTER FOR REDUCING CHANNEL SELECTIVITY

(75) Inventors: Hyung Ho Park, Anyang-si (KR); Min Seok Oh, Anyang-si (KR); Doo Hyun Sung, Anyang-si (KR); Jin Soo Choi, Anyang-si (KR); Jae Hoon Chung, Anyang-si (KR); Sung Ho Moon, Anyang-si (KR); Kyu Jin Park, Anyang-si (KR); Eun Jong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 12/678,955

(22) PCT Filed: Oct. 8, 2008

(86) PCT No.: PCT/KR2008/005901
§ 371 (c)(1),
(2), (4) Date: Mar. 18, 2010

(87) PCT Pub. No.: WO2009/048256
PCT Pub. Date: Apr. 16, 2009

(65) Prior Publication Data
US 2010/0208779 A1    Aug. 19, 2010

(30) Foreign Application Priority Data
Oct. 8, 2007   (KR) .................. 10-2007-0100699

(51) Int. Cl.
*H04L 1/02*   (2006.01)

(52) U.S. Cl.
USPC ............ 375/267; 375/316; 375/219; 375/340

(58) Field of Classification Search
USPC ................... 375/267, 316, 219, 340
See application file for complete search history.

(56) References Cited

U.S. PATENT DOCUMENTS

| | | | |
|---|---|---|---|
| 5,848,103 A | 12/1998 | Weerackody | |
| 2004/0091057 A1* | 5/2004 | Yoshida | 375/260 |
| 2005/0102133 A1* | 5/2005 | Rees | 704/205 |
| 2005/0254592 A1* | 11/2005 | Naguib et al. | 375/267 |
| 2005/0288873 A1* | 12/2005 | Urdaneta et al. | 702/45 |
| 2006/0098760 A1* | 5/2006 | Shen et al. | 375/299 |
| 2007/0098097 A1* | 5/2007 | Khan et al. | 375/260 |
| 2007/0211815 A1* | 9/2007 | Pan et al. | 375/267 |
| 2008/0068260 A1* | 3/2008 | Schipper et al. | 342/357.06 |
| 2009/0036150 A1* | 2/2009 | Liao et al. | 455/501 |

FOREIGN PATENT DOCUMENTS

| | | | |
|---|---|---|---|
| KR | 10-2007-0045343 A | | 5/2007 |
| WO | WO 2005/055465 A1 | | 6/2005 |
| WO | WO 2008/018703 A1 | | 2/2008 |

* cited by examiner

Primary Examiner — Leila Malek
(74) Attorney, Agent, or Firm — McKenna, Long & Aldridge, LLP.

(57) ABSTRACT

A transmitter for reducing time selectivity and/or frequency selectivity in a wireless communication system includes a plurality of transmit antennas, a phase shifter which is disposed for each transmit antenna and is configured to shift a phase of data transmitted through the transmit antenna by a phase shift value, and a channel selectivity processor configured to obtain the phase shift value by using a channel phase value fed back from a receiver.

1 Claim, 6 Drawing Sheets ary Application No. PCT/KR2008/005901, filed on Oct. 8, 2008, and claims priority to Korean Application No. 10-2007-0100699, filed on Oct. 8, 2007 each of which is hereby incorporated by reference in its entirety as if fully set forth herein.

TRANSMITTER FOR REDUCING CHANNEL SELECTIVITY

This application is a 35 U.S.C. §371 National Stage entry of International Application No. PCT/KR2008/005901, filed on Oct. 8, 2008, and claims priority to Korean Application No. 10-2007-0100699, filed on Oct. 8, 2007 each of which is hereby incorporated by reference in its entirety as if fully set forth herein.

TECHNICAL FIELD

The present invention relates to wireless communications, and more particularly, to a transmitter for reducing time selectivity and/or frequency selectivity in a wireless communication system.

BACKGROUND ART

Signals are transmitted from a transmitter to a receiver through various propagation paths in a wireless communication system. The propagation path changes over time according to a factor such as a multipath.

A channel environment can be classified into frequency flat fading and frequency selective fading occurring due to dispersion in a time domain when delay spread is achieved in the time domain. A Doppler frequency depending on a movement speed of a user equipment causes dispersion in a frequency domain, which leads to generation of fast fading and slow fading which are distinguished by a channel change in the time domain. The dispersion in the time domain is independent from the dispersion in the frequency domain.

When data passes through a frequency flat fading channel in a conventional multiple input multiple output (MIMO) system, dispersion constituted by channel gain values is not high but is similar throughout the entire frequency band. If a channel gain is high in the entire frequency band, an overall link throughput of the system is good. If the channel gain is low in the entire frequency band, the overall link throughput of the system may deteriorate. In addition, the MIMO system causes a significant computational complexity in the receiver.

A diversity technique for repeatedly transmitting the same data is developed to ensure communication reliability according to various propagation paths. When the same data is transmitted through different independent paths, even if a signal of a specific path is received with low signal strength, signals of the remaining paths may have high signal strength values. Examples of the diversity include frequency diversity that transmits data with different frequencies, time diversity that transmits data at different time points, and spatial diversity that uses a plurality of transmit (Tx) antennas.

Cyclic delay diversity improves a link throughput in such a manner that a frequency diversity gain is obtained by artificially increasing selectivity of a channel in the frequency domain. Data transmitted to the receiver through multiple antennas experiences different time delays. Therefore, according to a time delay, the receiver can estimate and detect data transmitted through a corresponding Tx antenna, thereby reducing the computational complexity. However, the cyclic delay diversity is not adaptive to a channel environment in the time domain. That is, even if the overall throughput of the system is affected by both a channel change in the time domain and a channel change in the frequency domain, there is a demerit in that the cyclic delay diversity is not adaptive to the channel change in the time domain.

An apparatus for regulating time-frequency selectivity is disclosed by the PCT international application No. PCT/KR2007/003625 filed by the applicant of the invention. The apparatus provides time diversity, frequency diversity, and multi-user diversity for channels, each of which independently operates in the time domain and the frequency domain.

However, a method of adaptively regulating channel selectivity when the channel selectivity is high in the time domain or the frequency domain is not disclosed.

DISCLOSURE OF INVENTION

Technical Problem

A method is sought for reducing channel selectivity.
A transmitter is sought for reducing channel selectivity.
A receiver is sought for feeding back a channel phase.

Technical Solution

According to an aspect of the present invention, a transmitter of a wireless communication system is provided. The transmitter includes a plurality of transmit antennas, a phase shifter which is disposed for each transmit antenna and is configured to shift a phase of data transmitted through the transmit antenna by a phase shift value, and a channel selectivity processor configured to obtain the phase shift value by using a channel phase value fed back from a receiver.

According to another aspect of the present invention, a receiver of a wireless communication system is provided. The receiver includes a receive antenna, and a channel selectivity estimator configured to select a candidate channel phase value from a candidate channel phase set including a plurality of candidate channel phase values, wherein the selected candidate channel phase value has a high correlation with respect to an equivalent channel along a path from each of transmit antennas to the receive antenna.

According to another aspect of the present invention, a data transmission method using a plurality of transmit antennas and at least one receive antenna is provided. The method includes receiving a candidate channel phase value selected from a plurality of candidate channel phase values constituting a candidate channel phase set, wherein the selected candidate channel phase value has a highest correlation with respect to an equivalent channel along a path from each of transmit antennas to the receive antenna, and cyclic-shifting and transmitting a phase of data for each transmit antenna by using the candidate channel phase value.

Advantageous Effects

Upon receiving information on a channel phase value through feedback information, a transmitter transmits data whose phase is cyclic shifted through respective transmit antennas. Since channel selectivity can be selectively or concurrently removed or reduced in time domain or frequency domain, various gains required by communication systems can be additionally obtained.

MODE FOR THE INVENTION

A technique to be described below can be used in various wireless communication systems. The wireless communication system can be widely deployed to provide a variety of communication services, such as voices, packet data, etc. The technique may be used in downlink or uplink. In general, the downlink is defined as a communication link from a base station (BS) to a user equipment (UE), and the uplink is defined as a communication link from the UE to the BS. The BS is generally a fixed station that communicates with the UE and may be referred to as another terminology, such as a node-B, a base transceiver system (BTS), an access point, etc. The UE may be fixed or mobile, and may be referred to as another terminology, such as a mobile station (MS), a user terminal (UT), a subscriber station (SS), a wireless device, etc.

The communication system may be a multiple-input multiple-output (MIMO) system or a multiple-input single-output (MISO) system. The MIMO system uses a plurality of transmit (Tx) antennas and a plurality of receive (Rx) antennas. The MISO system uses a plurality of Tx antenna and one Rx antenna.

In the downlink, a transmitter may be a part of the BS, and a receiver may be a part of the UE. In the uplink, the transmitter may be a part of the UE, and the receiver may be a part of the BS. The BS may include a plurality of receivers and a plurality of transmitters. The UE may include a plurality of receivers and a plurality of transmitters.

Figure 1:
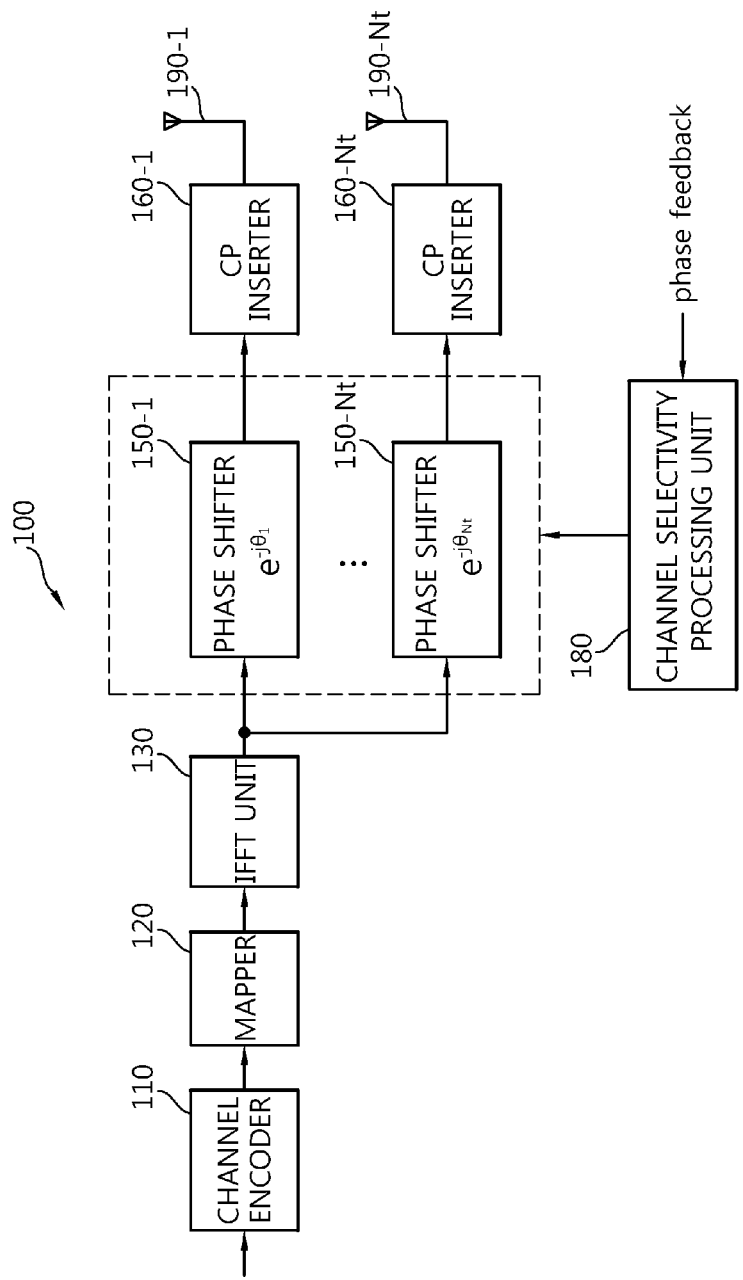
FIG. 1 is a block diagram showing a transmitter according to an embodiment of the present invention.

FIG. 1 is a block diagram showing a transmitter according to an embodiment of the present invention.

Referring to FIG. 1, a transmitter 100 includes a channel encoder 110, a mapper 120, an inverse fast Fourier transform (IFFT) unit 130, phase shifters 150-1, ..., 150-Nt, cyclic prefix (CP) inserters 160-1, ..., 160-Nt, and a channel selectivity processing unit 180. Further, the transmitter 100 includes Nt (Nt>1) antennas 190-1, ..., 190-Nt.

The channel encoder 110 receives a series of information bits, and generates coded data by encoding the information bits according to a predetermined coding scheme. The information bits may include text, voice, video or other types of data. The mapper 120 provides a symbol obtained by modulating the coded data according to a predetermined modulation scheme. That is, the coded data is mapped by the mapper 120 to a data symbol that represents a location according to an amplitude and phase constellation. The IFFT unit 130 transforms frequency-domain data symbols into time-domain symbols (hereinafter, referred to as orthogonal frequency division multiplexing (OFDM) symbols) by performing IFFT.

The phase shifters 150-1, ..., 150-Nt shift phases of the respective OFDM symbols by a phase shift value provided by the channel selectivity processing unit 180. For example, the first phase shifter 150-1 can generate a first phase shift sample $x_1'$ by shifting the OFDM symbol by a first phase shift value $\theta_1$. The second phase shifter 150-2 can generate a second phase shift sample $x_2'$ by shifting the OFDM symbol by a second phase shift value $\theta_2$. The Nt-th phase shifter 150-Nt can generate an Nt-th phase shift sample $x_{Nt}'$ by shifting the OFDM symbol by an Nt-th phase shift value $\theta_{Nt}$.

The phase shifters 150-1, ..., 150-Nt can cyclic shift the phases of the OFDM symbols. Cyclic shifting is used to generate a phase shift symbol in such a manner that, when the OFDM symbols are shifted by an assigned phase shift value, a shifted-out portion is moved to be attached to a newly generated symbol portion.

Operations of the phase shifters 150-1, ..., 150-Nt can be expressed as shown:

MathFigure 1

$$x_k' = xe^{-j\theta_k t} = xe^{-j2\pi f_k t} \quad [\text{Math.1}]$$

where $x_k'$ denotes a phase shift symbol for a k-th Tx antenna, x denotes an OFDM symbol, and $\theta_k$ denotes a phase shift value for the k-th Tx antenna where $\theta_k = 2\pi f_k$.

The CP inserters 160-1, ..., 160-Nt insert CPs into time-domain symbols so as to remove inter-subcarrier interference and inter-symbol interference. The symbols inserted with the CPs are transmitted through the respective Tx antennas 190-1, ..., 190-Nt.

Figure 2:
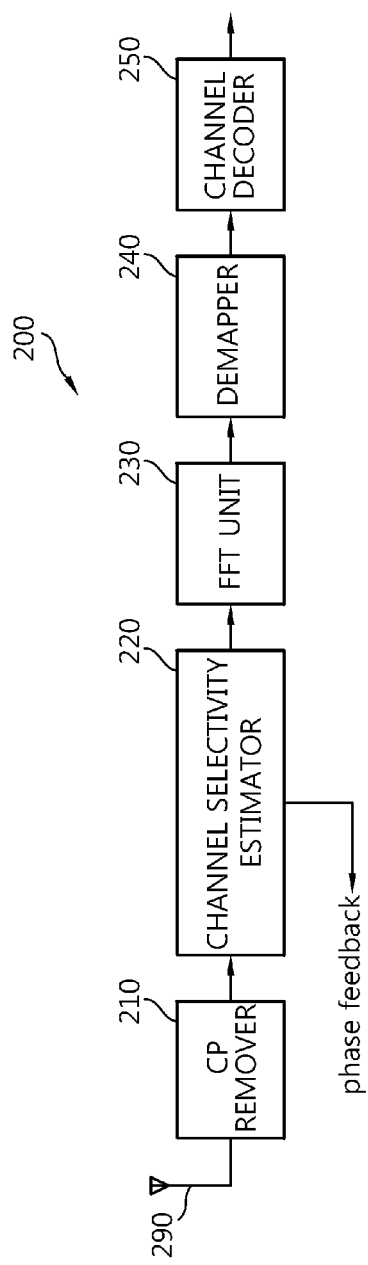
FIG. 2 is a block diagram showing a receiver according to an embodiment of the present invention.

The channel selectivity processing unit 180 receives a channel phase value which is fed back from a receiver 200 of FIG. 2, and transmits the phase shift values for the OFDM symbols to the phase shifters 150-1, ..., 150-Nt by performing precoding for reducing the channel selectivity. According to the fed-back channel phase value, the channel selectivity processing unit 180 reduces the channel selectivity by cyclic shifting a phase of data transmitted through each Tx antenna.

The channel selectivity processing unit 180 can transmit to the phase shifters 150-1, ..., 150-Nt the fed-back channel phase value without alteration as the phase shift value. In this case, the channel phase value is equal to the phase shift value. Alternatively, proper precoding can be performed by considering multi-users or power of Tx antennas. In this case, the channel phase value may be different from the phase shift value.

Although the phases of the OFDM symbols are cyclic shifted herein, the same operation can be obtained when frequencies are cyclic delay shifted in a frequency domain. This is because, when the phase shifting is achieved in a time domain, a delay of signal response in the frequency domain is constant due to duality of signals. The phase shifters 150-1, ..., 150-Nt may be disposed at a front stage of the IFFT unit 130 instead of a rear stage of the IFFT unit 130.

FIG. 2 is a block diagram showing a receiver according to an embodiment of the present invention.

Referring to FIG. 2, a receiver 200 includes a CP remover 210, a channel selectivity estimator 220, a fast Fourier transform (FFT) unit 230, a demapper 240, and a channel decoder 250. The receiver 200 includes one Rx antenna 290. The receiver 200 may include Nr (Nr=1) Rx antennas 290.

The CP remover 210 removes a CP from a signal received through the Rx antenna 290. The channel selectivity estimator 220 calculates a candidate channel phase value and then feeds back the candidate channel phase value to the transmitter 100. The FFT unit 230 transforms a time-domain symbol into a frequency-domain symbol by performing FFT. The demapper 240 demaps the frequency-domain symbol to coded data. The channel decoder 250 decodes the coded data according to a predetermined decoding scheme.

From CP-removed time-domain samples, the channel selectivity estimator 220 estimates a correlation between a channel value, which is in association with data to be transmitted through a corresponding Tx antenna, and candidate channel phase values belonging to a candidate channel phase set. A candidate channel phase value, which has a greatest correlation value with respect to channels along paths from respective Tx antennas to the Rx antenna, is selected as a channel phase value. The selected channel phase value is fed back to the transmitter 100.

The channel selectivity estimator 220 estimates the channel phase value in the time domain. However, this is for exemplary purposes only, and thus the channel estimation value may be estimated in the frequency domain.

For clarity, a method of reducing channel selectivity in a receiver having one Rx antenna will be first described.

In a time domain (or frequency domain), the channel selectivity estimator 220 has a channel phase value most similar to a phase of a time domain (or frequency domain) of a channel path between a Tx antenna and the Rx antenna. To reduce computational complexity, a channel phase value can be selected from a candidate channel phase set which is a group of a plurality of channel phase values. The more the number of channel phase values included in the candidate channel phase set, the greater the overhead of information that is fed back to the transmitter. However, the more the number of channel phase values included in the candidate channel phase set, the more accurate the channel phase value to be obtained.

An equivalent channel for channels through which signals pass in the time domain from Nt Tx antennas to one Rx antenna can be expressed as shown:

MathFigure 2

$$h(t) = \|h_2\| \cdot e^{j2\phi_1 t} + \|h_2\| \cdot e^{j\phi_2 t} + \ldots + \|h_{Nt}\| \cdot e^{j\phi_{Nt} t} \qquad [\text{Math.2}]$$

where hk denotes a channel along a path from a k-th Tx antenna to the Rx antenna, and fk denotes a phase value for a k-th channel. Channels have different phase values and sizes in respective paths.

A correlation of a candidate channel phase value and an equivalent channel represented in the time domain along a path from a j-th Tx antenna to the Rx antenna can be obtained as shown:

MathFigure 3

$$\text{Choose } \theta_m^G \Leftarrow \operatorname*{argMax}_m \left[ \int_{T_s} h_j(n) * e^{j\theta_m^G n} dn = \int_{T_s} (\|h_j(n)\| \cdot e^{j\phi_j n}) * e^{j\theta_m^G n} dn \right] \qquad [\text{Math. 3}]$$

where $\theta_m^G$ denotes an m-th candidate channel phase value stored in the channel selectivity estimator 220. Ts denotes a sampling duration. If M denotes the number of candidate channel phase values included in the candidate channel phase set, a candidate channel phase value having a highest correlation value is selected as a channel phase value while changing the value m from 1 to M. By comparing channel correlations between an equivalent channel along a path from the j-th Tx antenna to the Rx antenna and the candidate channel phase values included in the candidate channel phase set, a candidate channel phase value having a highest correlation value is selected as the channel phase value.

According to the number of channel phase values, a channel phase value finally found by the channel selectivity estimator 220 can be fed back to the transmitter in various manners such as quantization.

Now, a method of reducing channel selectivity in a receiver having multiple Rx antennas will be described.

A correlation of a candidate channel phase value and an equivalent channel represented in the time domain along a path from a j-th Tx antenna to an i-th Rx antenna can be obtained as shown:

MathFigure 4

$$\int_{T_s} h_{ij}(n) * e^{j\theta_m^G n} dn = \int_{T_s} (\|h_{ij}(n)\| \cdot e^{j\phi_{ij} n}) * e^{j\theta_m^G n} dn = \tilde{h}_{ij} \approx h_{ij} \qquad [\text{Math.4}]$$

where i=1, . . . , Nr, j=1, . . . , Nt, M, where M denotes the number of candidate channel phase values, $h_{ij}$ denotes an equivalent channel represented in the time domain along a path from the j-th Tx antenna to the i-th Rx antenna. Nr denotes the number of Rx antennas. Nt denotes the number of Tx antennas. $\phi_{ij}$ denotes a phase value of the equivalent channel along the path from the j-th Tx antenna to the i-th Rx antenna. $\theta_m^G$ denotes an m-th candidate channel phase value. Ts denotes a sampling duration.

Figure 3:
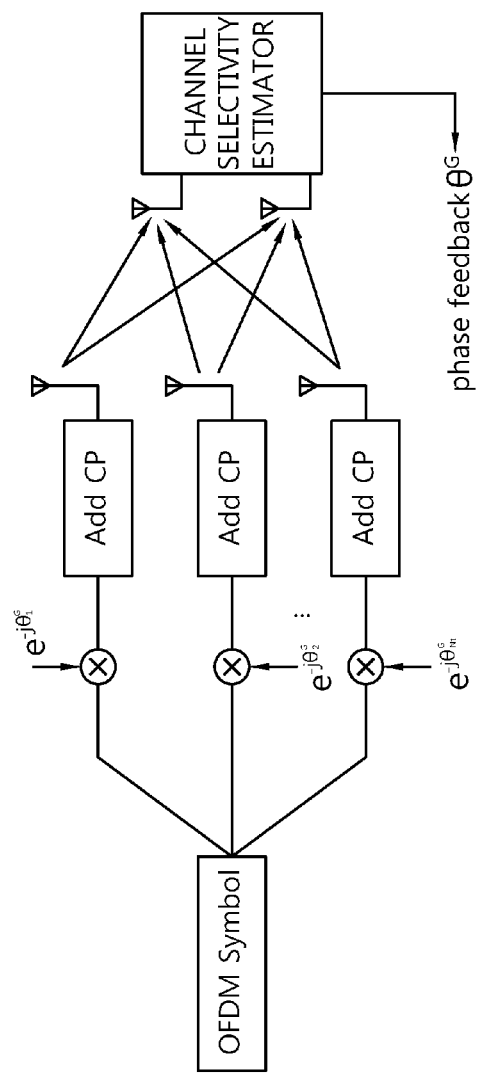
FIG. 3 shows an example of a method of reducing channel selectivity for multiple receive antennas.

FIG. 3 shows an example of a method of reducing channel selectivity for multiple Rx antennas.

Referring to FIG. 3, in case using the multiple Rx antennas, an equivalent channel is formed from Tx channels with respect to the Rx antennas. As a result, the number of formed equivalent channels is equal to the number of Rx antennas. Equation 5 shows an equivalent channel in the time domain and formed by each Rx antenna.

MathFigure 5

$$\|h_{11}\|e^{j\phi_{11} n}e^{-j\theta_1^G n} + \|h_{12}\|e^{j\phi_{12} n}e^{-j\theta_2^G n} +,$$
$$\ldots, + \|h_{1Nt}\|e^{j\phi_{1Nt} n}e^{-j\theta_{Nt}^G n} = \alpha$$
$$\|h_{21}\|e^{j\phi_{21} n}e^{-j\theta_1^G n} + \|h_{22}\|e^{j\phi_{22} n}e^{-j\theta_2^G n} +,$$
$$\ldots, + \|h_{2N_T}\|e^{j\phi_{2Nt} n}e^{-j\theta_{Nt}^G n} = \beta$$
$$\vdots \qquad \vdots \qquad \vdots$$
$$\|h_{Nr1}\|e^{j\phi_{Nr1} n}e^{-j\theta_1^G n} + |h_{Nr2}|e^{j\phi_{Nr2} n}e^{-j\theta_2^G n} +,$$
$$\ldots, + \|h_{NrNt}\|e^{j\phi_{NrNt} n}e^{-j\theta_{Nt}^G n} = \gamma \qquad [\text{Math. 5}]$$

The number of equations for expressing the equivalent channel is equal to the number of Rx antennas. The equation is composed of one candidate channel phase set to be fed back to the transmitter in order to reduce selectivity in each equivalent channel. By solving the equation, the candidate channel phase set capable of reducing the selectivity of each equivalent channel is estimated.

Equation 5 is an Nt-th order equation. Candidate channel phase sets are solutions of the equation. There is no restriction on mathematical algorithms for obtaining the solutions of the Nt-th order equation.

In Equation 5, $\alpha$, $\beta$, and $\gamma$ denote magnitudes when selectivity of a corresponding equivalent channel is completely reduced. Therefore, $\alpha$, $\beta$, and $\gamma$ can be expressed by Equation 6 below.

MathFigure 6

$$\alpha = \|k_{11}\| + \|h_{12}\| +, \ldots, \|h_{1Nt}\|$$
$$\beta = \|k_{21}\| + \|h_{22}\| +, \ldots, \|h_{2Nt}\|$$
$$\gamma = \|k_{Nr1}\| + \|h_{Nr2}\| +, \ldots, \|h_{NrNt}\| \qquad [\text{Math.6}]$$

Equation 7 below shows only a phase of an equivalent channel formed by each Rx antenna.

MathFigure 7

$$e^{j\phi_{11}n}e^{-j\theta_1^G n} + e^{j\phi_{12}n}e^{-j\theta_2^G n} +, \ldots, +e^{j\phi_{1Nt}n}e^{-j\theta_{Nt}^G n} = 1$$
$$e^{j\phi_{21}n}e^{-j\theta_1^G n} + e^{j\phi_{22}n}e^{-j\theta_2^G n} +, \ldots, +e^{j\phi_{2Nt}n}e^{-j\theta_{Nt}^G n} = 1$$
$$\vdots \qquad \vdots \qquad \vdots$$
$$e^{j\phi_{Nr1}n}e^{-j\theta_1^G n} + e^{j\phi_{Nr2}n}e^{-j\theta_2^G n} +, \ldots, +e^{j\phi_{NrNt}n}e^{-j\theta_{Nt}^G n} = 1$$

[Math. 7]

Similarly to Equation 6 above, Equation 7 is an Nt-th order equation. Candidate channel phase sets are solutions of the equation. Since the solutions of the equation are obtained by considering only the phase component in the reducing of the channel selectivity, a computational complexity is reduced.

When a plurality of Rx antennas are used, Equation 8 shows a determinant for expressing a candidate channel phase set by considering an equivalent channel formed by the plurality of Rx antennas in the channel selectivity estimator.

MathFigure 8

$$\theta^G = \begin{bmatrix} e^{-j\theta_1^G n} \\ e^{-j\theta_2^G n} \\ \vdots \\ e^{-j\theta_{Nt}^G n} \end{bmatrix}$$

$$= \begin{bmatrix} 1 \\ 1 \\ \vdots \\ 1 \end{bmatrix} \begin{bmatrix} e^{j\phi_{11}n} & e^{j\phi_{12}n} & \ldots & e^{j\phi_{1Nt}n} \\ e^{j\phi_{21}n} & e^{j\phi_{22}n} & \ldots & e^{j\phi_{2Nt}n} \\ \vdots & \vdots & \vdots & \vdots \\ e^{j\phi_{Nr1}n} & e^{j\phi_{Nr2}n} & \ldots & e^{j\phi_{NrNt}n} \end{bmatrix}^\dagger$$

[Math. 8]

In Equation 8, $\theta^G$ denotes a column matrix for expressing the candidate channel phase set, and † denotes an inverse matrix or invertible matrix of the matrix.

Upon receiving information on a channel phase value through feedback information, a transmitter transmits data whose phase is cyclic shifted through respective transmit antennas. Since channel selectivity can be selectively or concurrently removed or reduced in a time domain or a frequency domain, the present invention can be effectively used as a mean for obtaining various gains required by communication systems.

Figure 4:
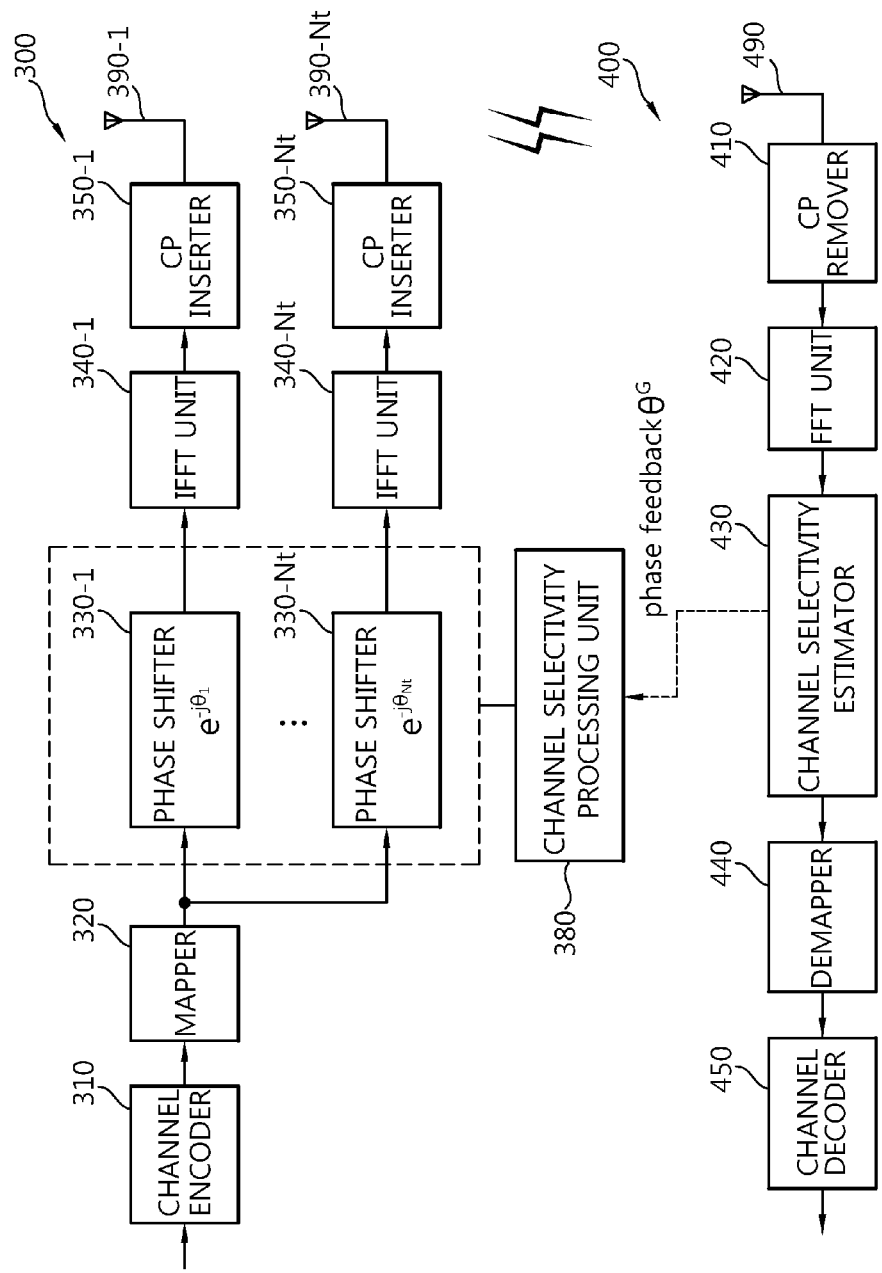
FIG. 4 is a block diagram showing a transmitter and a receiver according to another embodiment of the present invention.

FIG. 4 is a block diagram showing a transmitter and a receiver according to another embodiment of the present invention.

Referring to FIG. 4, a transmitter 300 includes a channel encoder 310, a mapper 320, phase shifters 330-1, ..., 330-Nt, IFFT units 340-1, ..., 340-Nt, CP inserters 350-1, ..., 350-Nt, and a channel selectivity processing unit 380. The transmitter 300 includes Nt (Nt>1) Tx antennas 390-1, ..., 390-Nt.

The channel selectivity processing unit 380 receives a channel phase value which is fed back from a receiver 400, and transmits to the respective phase shifters 330-1, ..., 330-Nt the phase shift values obtained by performing precoding for reducing the channel selectivity.

The phase shifters 330-1, ..., 330-Nt shift phases of data symbols (frequency-domain symbols) by a phase shift value provided by the channel selectivity processing unit 380. The phase shifters 330-1, ..., 330-Nt perform cyclic shifting on phases of symbols in a frequency domain.

The receiver 400 includes a CP remover 410, an FFT unit 420, a channel selectivity estimator 430, a demapper 440, and a channel decoder 450. The receiver 400 includes one Rx antenna 490. The receiver 400 may include Nr (Nr=1) Rx antennas 490.

The CP remover 410 removes a CP from a signal received through the Rx antenna 490. The FFT unit 420 transforms a CP-removed time-domain sample into a frequency-domain symbol by performing FFT. The channel selectivity estimator 430 calculates the candidate channel phase value in the frequency domain and feeds back the candidate channel phase value to the transmitter 300. The demapper 440 demaps the frequency-domain symbol to coded data. The channel decoder 450 decodes the coded data according to a predetermined decoding scheme.

The channel selectivity estimator 430 configures an equivalent channel for each Rx antenna in the frequency domain, and then transmits a candidate channel phase value corresponding to its solution as feedback information.

Figure 5:
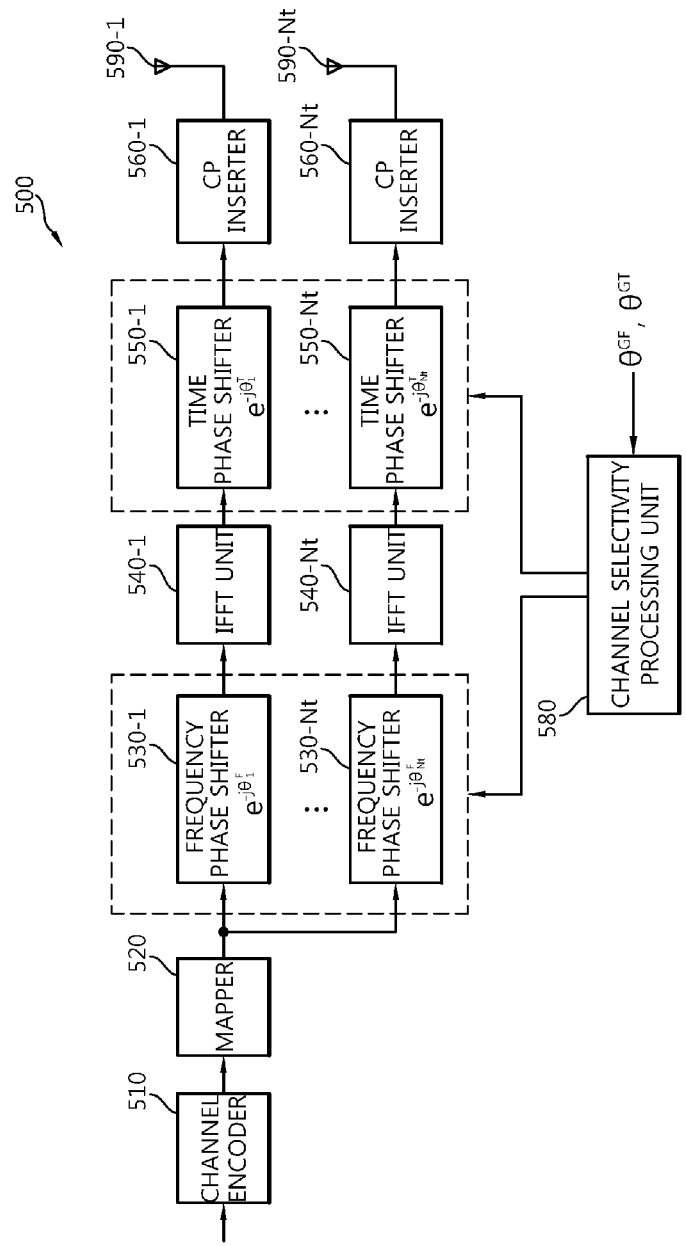
FIG. 5 is a block diagram showing a transmitter according to another embodiment of the present invention.

FIG. 5 is a block diagram showing a transmitter according to another embodiment of the present invention.

Referring to FIG. 5, a transmitter 500 includes a channel encoder 510, a mapper 520, frequency phase shifters 530-1, ..., 530-Nt, IFFT units 540-1, ..., 540-Nt, time phase shifters 550-1, ..., 550-Nt, CP inserters 560-1, ..., 560-Nt, and a channel selectivity processing unit 580. The transmitter 500 includes Nt (Nt>1) Tx antennas 590-1, ..., 590-Nt.

The channel selectivity processing unit 580 receives a frequency channel phase value $\theta^{GF}$ and a time channel phase value $\theta^{GT}$ which are fed back from a receiver (not shown). Further, the channel selectivity processing unit 580 transmits to the frequency phase shifters 530-1, ..., 530-Nt a frequency phase shift value $\theta^F_k$ (k=1, ..., Nt) obtained by performing precoding for reducing the channel selectivity, and transmits to the time phase shifters 550-1, ..., 550-Nt a time phase shift value $\theta^T_k$ (k=1, ..., Nt).

The frequency phase shifters 530-1, ..., 530-Nt shift phases of data symbols (frequency-domain symbols) by a frequency phase shift value provided by the channel selectivity processing unit 580. The time phase shifters 550-1, ..., 550-Nt shift phases of OFDM symbols (time-domain symbols) by a time phase shift value provided by the channel selectivity processing unit 580.

A channel selectivity estimator (not shown) of the receiver configures an equivalent channel of a corresponding region in a frequency domain and a time domain and thereafter estimates a set of candidate channel phase values capable of reducing the channel selectivity. Then, the channel selectivity estimator transmits feedback information to the transmitter. The feedback information consists of candidate channel phase sets in the frequency domain and candidate channel phase sets in the time domain. The transmitter performs cyclic phase shifting for reducing selectivity of a current channel in the frequency domain and the time domain.

Figure 6:
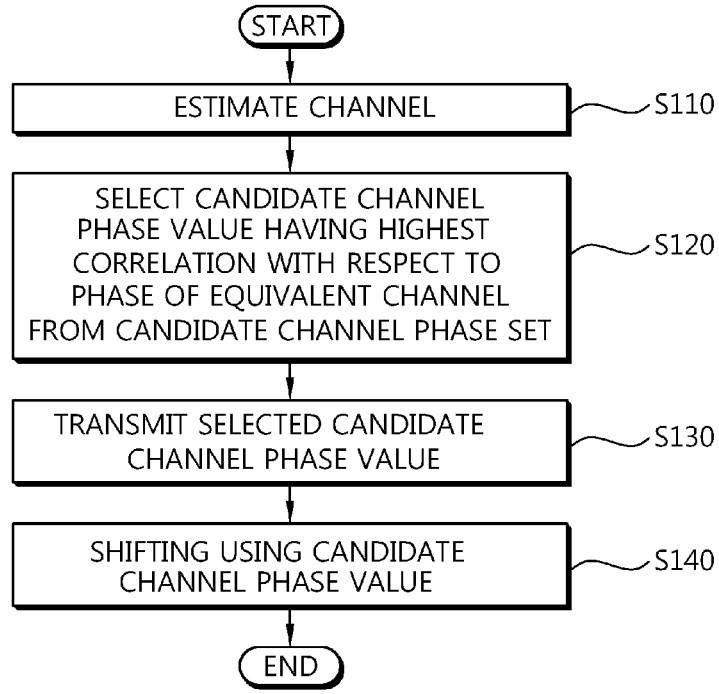
FIG. 6 is a flowchart showing a method of reducing channel selectivity when one receive antenna is used.

FIG. 6 is a flowchart showing a method of reducing channel selectivity when one Rx antenna is used.

Referring to FIG. 6, an equivalent channel is obtained by estimating a channel along a path from each Tx antenna to the Rx antenna (S110). By comparing a correlation between a candidate channel phase set and an amplitude and phase of an equivalent channel or a phase of a channel for each Tx antenna, a candidate channel phase value having a highest correlation is selected for each Tx antenna among candidate channel phase values belonging to a candidate channel phase set (S120). The selected candidate channel phase value is transmitted as a channel phase value (S130). A transmitter performs cyclic phase shifting for each Tx antenna by using the received channel phase value (S140). The cyclic phase shifting can be performed in a frequency domain and/or a time domain. The above steps are repeated until convergence is achieved to the channel selectivity in the required time domain or frequency domain. Alternatively, the above steps are repeated by a predetermined number of times.

Figure 7:
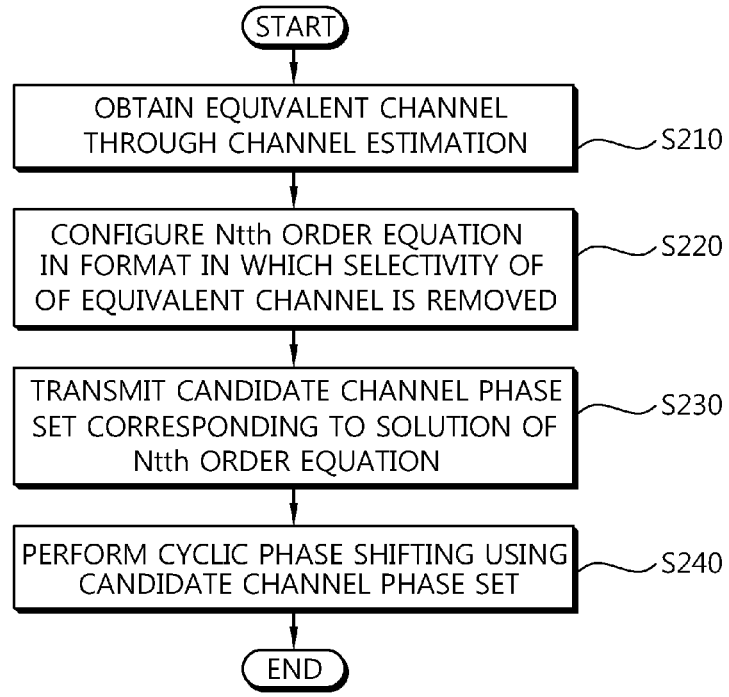
FIG. 7 is a flowchart showing a method of reducing channel selectivity when multiple receive antennas are used.

FIG. 7 is a flowchart showing a method of reducing channel selectivity when multiple Rx antennas are used.

Referring to FIG. 7, an equivalent channel is obtained by estimating a channel along a path from each Tx antenna to each Rx antenna (S210). An Nt-th order equation is configured in a format in which selectivity of the equivalent channel is removed in a time domain or a frequency domain (S220). If complexity is not considered in this case, the Nt-th order equation can be configured with the equivalent channel in the time domain or the frequency domain.

Candidate channel phase sets are transmitted in the time domain or the frequency domain corresponding to the solution of the Nt-th order equation (S230). A transmitter performs cyclic phase shifting for each Tx antenna by using feedback information regarding the candidate channel phase sets (S240). The above steps are repeated until convergence is achieved to the channel selectivity in the required time domain or frequency domain. Alternatively, the above steps are repeated by a predetermined number of times.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A receiver of a wireless communication system, the receiver comprising:
at least one receive antenna;
a cyclic prefix (CP) remover configured to remove a CP from a signal received through the at least one receive antenna;
a channel selectivity estimator configured to select a candidate channel phase value from a candidate channel phase set including a plurality of candidate channel phase values and feedback the selected candidate channel phase value to a transmitter, wherein the selected candidate channel phase value has the greatest correlation with respect to an equivalent channel along a path from each transmit antenna to the at least one receive antenna;
a fast Fourier transform (FFT) unit configured to transform a time-domain symbol into a frequency-domain symbol by performing FFT;
a demapper configured to demap the frequency-domain symbol to coded data; and
a channel decoder configured to decode the coded data according to a predetermined decoding scheme,
wherein the channel selectivity estimator is disposed in a front stage of the FFT unit and after the CP remover to obtain the selected candidate channel phase value in a time domain, and
wherein when a number of the at least one receive antenna is more than one, a correlation of the selected candidate channel phase value and the equivalent channel represented in the time domain along a path from a $j^{th}$ transmit antenna to an $i^{th}$ receive antenna is determined based on the equation:

$$\int_{T_s} h_{ij}(n)^* e^{j\theta_m^G n} dn = \int_{T_s} (\|h_{ij}(n)\| \cdot e^{j\theta_{ij}n})^* e^{j\theta_m^G n} dn = \tilde{h}_{ij} \approx j_{ij}$$

where i=1, . . . , Nr, j=1, . . . , Nt, m=1, . . . , M, M denotes a number of candidate channel phase values, $h_{ij}$ denotes the equivalent channel represented in the time domain along the path from the $j^{th}$ transmit antenna to the $i^{th}$ receive antenna, Nr denotes a number of the at least one receive antenna, Nt denotes a number of the transmit antennas, $\phi_{ij}$ denotes a phase value of the equivalent channel along the path from the $j^{th}$ transmit antenna to the $i^{th}$ receive antenna, $\theta_m^G$ denotes an $m^{th}$ candidate channel phase value stored in the channel selectivity estimator, and Ts denotes a sampling duration.

* * * * *